US010391683B2

(12) United States Patent
Ziaie et al.

(10) Patent No.: US 10,391,683 B2
(45) Date of Patent: Aug. 27, 2019

(54) METHOD TO GENBERATE AN ULTRA-STRETCHABLE ELECTRICAL AND HEAT CONDUCTIVE ARRANGEMENT

(71) Applicant: Purdue Research Foundation, West Lafayette, IN (US)

(72) Inventors: Babak Ziaie, West Lafayette, IN (US); Rahim Rahimi, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 287 days.

(21) Appl. No.: 15/223,971

(22) Filed: Jul. 29, 2016

(65) Prior Publication Data

US 2017/0098491 A1   Apr. 6, 2017

Related U.S. Application Data

(60) Provisional application No. 62/168,891, filed on May 31, 2015.

(51) Int. Cl.
| | |
|---|---|
| *B29C 39/10* | (2006.01) |
| *B29C 45/14* | (2006.01) |
| *B29C 70/68* | (2006.01) |
| *B29C 70/82* | (2006.01) |
| *B29C 70/88* | (2006.01) |
| *A41D 1/00* | (2018.01) |

(52) U.S. Cl.
CPC .............. *B29C 39/10* (2013.01); *A41D 1/005* (2013.01); *B29C 45/14065* (2013.01); *B29C 70/682* (2013.01); *B29C 70/82* (2013.01); *B29C 70/885* (2013.01); *F28F 2255/02* (2013.01)

(58) Field of Classification Search
CPC ............ B29C 2045/14; B29C 2045/14; B29C 2045/141; B29C 39/10; B29C 45/14; B29C 70/68–865; B29C 7/688; B29C 45/14; B29C 70/82
See application file for complete search history.

(56) References Cited

U.S. PATENT DOCUMENTS 3,697,635 A * 10/1972 Dietzsch ................ B01D 61/46
264/135

OTHER PUBLICATIONS

Rahimi, Rahim, et al. "A sewing-enabled stitch-and-transfer method for robust, ultra-stretchable, conductive interconnects." Journal of Micromechanics and Microengineering 24.9 (Aug. 19, 2014): 095018. (Year: 2014).*
Rahimi, R., et al. "A low-cost fabrication technique for direct sewing stretchable interconnetions for wearable electronics." 2015 Transducers—2015 18th International Conference on Solid-State Sensors, Actuators and Microsystems (TRANSDUCERS). IEEE, Jun. 21, 2015. (Year: 2015).*

(Continued)

*Primary Examiner* — Benjamin A Schiffman
(74) *Attorney, Agent, or Firm* — Purdue Research Foundation (57) ABSTRACT

A wearable accessory capable of communicating data to actuators or from sensors is disclosed. The wearable accessory includes a conductor wire disposed in a moldable medium according to a predetermined pattern, the moldable medium being an electrically insulating material, the conductor wire terminating at an input and an output.

7 Claims, 10 Drawing Sheets

(56) References Cited

OTHER PUBLICATIONS

Xu, Feng, and Yong Zhu. "Highly conductive and stretchable silver nanowire conductors." Advanced materials 24.37 (Jul. 12, 2012): 5117-5122. (Year: 2012).*

Kim, Hyun-Joong, et al. "A biaxial stretchable interconnect with liquid-alloy-covered joints on elastomeric substrate." Journal of Microelectromechanical systems 18.1 (Jan. 20, 2009): 138-146. (Year: 2009).*

Lipomi, Darren J., et al. "Skin-like pressure and strain sensors based on transparent elastic films of carbon nanotubes." Nature nanotechnology 6.12 (Oct. 23, 2011): 788. (Year: 2011).*

Rahimi, Rahim, et al. "Highly stretchable and sensitive unidirectional strain sensor via laser carbonization." ACS applied materials & interfaces 7.8 (Feb. 16, 2015): 4463-4470. (Year: 2015).*

Kim, Dae-Hyeong, et al. "Stretchable and foldable silicon integrated circuits." Science 320.5875 (Apr. 25, 2008): 507-511. (Year: 2008).*

* cited by examiner

METHOD TO GENBERATE AN ULTRA-STRETCHABLE ELECTRICAL AND HEAT CONDUCTIVE ARRANGEMENT

CROSS-REFERENCE TO RELATED APPLICATIONS

The present U.S. patent application is related to and claims the priority benefit of U.S. Provisional Patent Application Ser. No. 62/168,891, filed May 31, 2015, the contents of which are hereby incorporated by reference in their entirety into the present disclosure.

GOVERNMENT SUPPORT CLAUSE

This invention was made with government support under EFRI1240443 awarded by the National Science Foundation. The government has certain rights in the invention.

TECHNICAL FIELD

The present application relates to arrangements for heat and electrical connectivity and in particular to ultra-stretchable arrangements capable of conducting electricity or heat.

BACKGROUND

This section introduces aspects that may help facilitate a better understanding of the disclosure. Accordingly, these statements are to be read in this light and are not to be understood as admissions about what is or is not prior art.

Realizing low cost and highly stretchable and robust electrical and heat transfer arrangements remain elusive in stretchable electronics. Previously reported stretchable interconnects require complicated fabrication processes with resulting devices exhibiting limited stretchability, poor reliability, and large gauge factors.

In addition, wearable or drape-able arrangements that allow heat transfer (i.e., transferring heat from an individual's body outward for the purposes of cooling or to an individual's body for the purposes of warming) for both general garment purposes or for medical applications where heat transfer needs to be managed at close proximity to an individual's skin also remains elusive.

There is, therefore an unmet need for novel arrangements that can provide either electrical conduction or heat transfer where the arrangements are highly stretchable and can be produced at low costs.

SUMMARY

A wearable accessory capable of communicating data to actuators or from sensors is disclosed. The accessory includes a conductor wire disposed in a moldable medium according to a predetermined pattern, the moldable medium being an electrically insulating material, the conductor wire terminating at an input and an output.

A wearable heat transfer accessory is disclosed. The accessory includes a tubular member disposed in a moldable medium according to a predetermined pattern, the moldable medium having a thermal conductivity coefficient suitable for exchanging heating to or from a subject's body, the tubular member terminating at an inlet and an outlet.

A method to generate a stretchable conductor is disclosed. The method includes placing a conductor wire on one side of a substrate according to a predetermined pattern by securing a dissolvable filament for temporary maintenance of placement of the conductor wire on the substrate. The method also includes placing the filament-secured substrate in a mold, and pouring a moldable medium on to the mold on top of the filament-secured substrate. The method further includes crosslinking the moldable medium thereby allowing the conductor wire to adhere to the moldable medium. The method also includes dissolving the dissolvable filament, and removing the substrate from the moldable medium.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 2b depicts an exploded view of needle assembly of the sewing machine of FIG. 2a.

The attached drawings are for purposes of illustration and are not necessarily to scale.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
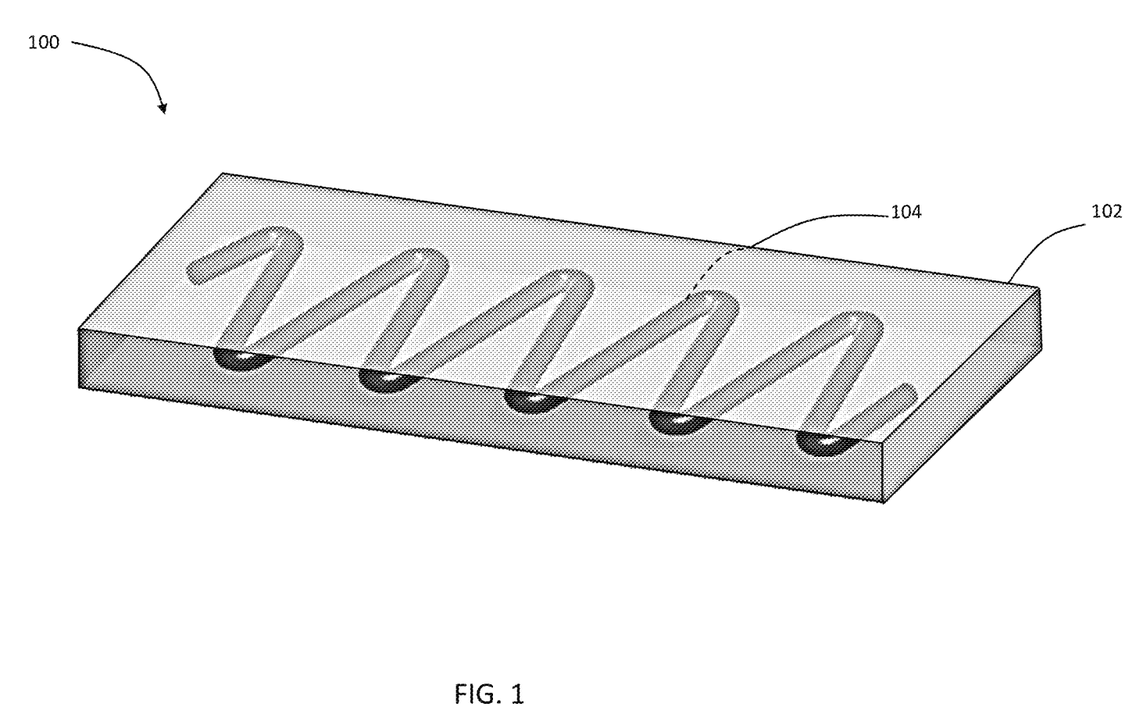
FIG. 1 depicts a perspective view of a highly stretchable electrical conduction and/or heat transfer arrangement according to the present disclosure is provided.

Novel arrangements that can provide either electrical conduction or heat transfer where the arrangements are highly stretchable and can be produced at low costs are disclosed in the present disclosure. According to one embodiment, disclosed is a novel sew-and-transfer method for rapid fabrication of low-cost highly stretchable interconnects that can conduct electrical signals and current. Referring to FIG. 1, a perspective view of an embodiment of a highly stretchable electrical conduction and/or heat transfer arrangement 100 is shown. The arrangement 100 includes a medium 102 and a member 104 which can be a wire for electrical conduction applications or a conduit for heat transfer applications. The medium 102, e.g., a polymer-based material, is a suitable material that can be used in connection with a mold to generate arrangements 100 prepared in predefined shapes. For electrical conductivity applications the medium 102 is electrically insulating. However, for heat conductivity applications the medium 102 is capable of conducting heat (e.g., polymers with heat conducting fillers). Alternatively, the medium 102 can be selected from a group of materials which are both excellent as far as electrical insulation properties as well as heat conduction properties. Regardless, the medium 102 should be provide significant amount of pliability.

As an alternative to expensive cleanroom fabrication techniques, a simple place-and-transfer method for fabrication of the highly stretchable electrical conduction and/or heat transfer arrangement 100 is provided. In the embodiment of the method provided below, a sewing machine is used, however, any other placement device similar to a sewing machine can be used to form complex patterns embedded in, e.g., a polymeric medium. The place-and-transfer method of the present disclosure can be used with elastomers, wires, and conduits. According to one embodiment, intricate arrays of metallic wires or conduits can be placed onto a poly(ethylene terephthalate) (PET) sheet used as a temporary substrate by securing the wires and conduits on the temporary substrate with threads, the placed wire or conduit can be transferred to a stretchable medium (ECOFLEX), the PET can then be released the above combination and then the threads dissolved in a solution. By adjusting the tension, geometry, and length of the patterns, a variety of interconnects with stretchability of up to 500% can be fabricated without changing the electrical characteristics of the wire (i.e., resistance of the wire) or fluid mechanics of fluid flowing through the conduit (i.e., pressure drop between the inlet and the outlet).

Figure 2A:
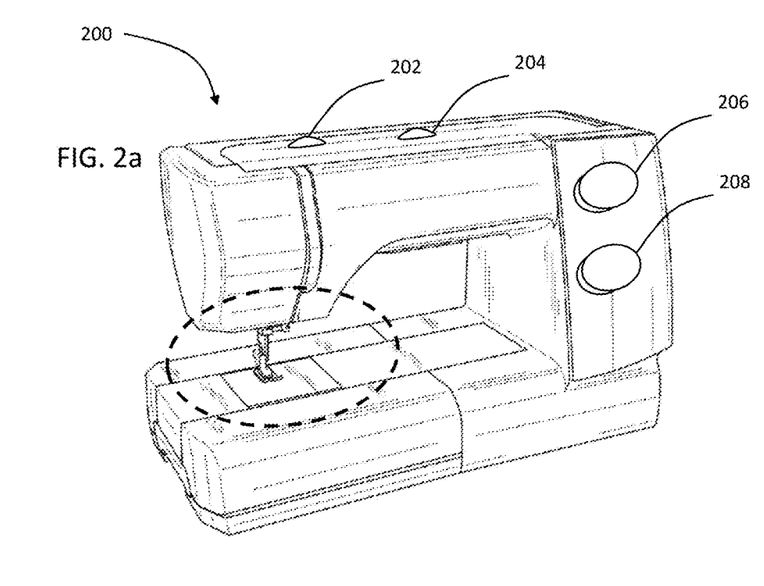
FIG. 2a depicts a conventional sewing machine used to partially fabricate the highly stretchable electrical conduction and/or heat transfer arrangement of FIG. 1.

According to one embodiment, a conventional sewing machine 200 is used to place the wires on to the temporary substrate as depicted in FIG. 2a. The sewing machine 200 offers various controls which according to one embodiment include thread tension via a thread tension dial 202, stitch width via a stitch width dial 204, stitch length via a stitch length dial 206, and various pattern designs via a pattern selector dial 208, all of which can be adjusted for optimum desired result. Together, these parameters influence the operation of the sewing machine 200. A close-up of the need assembly 250 is provided in FIG. 2b. The need assembly 250 includes a supply of upper thread 252 (which is a dissolvable material, e.g., in water) that is fed through a needle 254 which is configured to penetrate a substrate 256 to be processed, a bobbin 260 which provides lower thread 258 (i.e., the electrical wire for the electrical conductivity applications), and a shuttle hook 262.

Figure 2B:
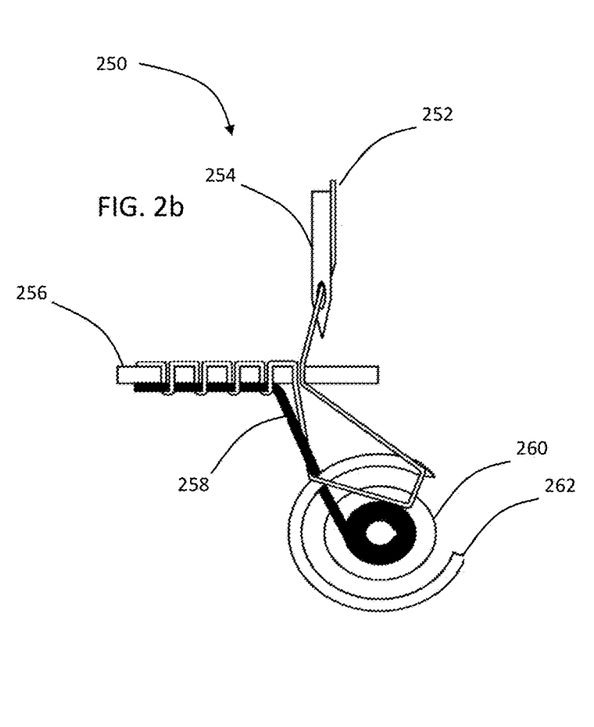

During operation, the needle 254 penetrates the substrate 256, and the shuttle hook 262 interlaces the upper thread 252 with the lower thread 258 supplied from the bobbin 260 to provide a temporary placement mechanism. The tension of the upper thread 252 determines the degree to which it penetrates the substrate 256. If the tension is sufficiently high, then the upper thread 252 remains towards the upper surface of the substrate 256. In contrast, if the tension is too low, the upper thread 252 may pierce through the needle-punched holes on the substrate 256. Additionally, the stitch width dial 204 controlling the stitch width, stitch length dial 206 controlling the stitch length, and pattern selector dial 208 controlling the pattern collectively control the lateral motion of the needle during the sewing process, allowing for the creation of various sewing patterns (e.g., zigzags). These capabilities, along with the ability to accommodate two types of threads (e.g., a dissolvable polymer as the upper thread 252 and a thin wire as the lower thread 258) provide robust stretchable interconnects.

It should be noted that while a sewing machine 200 is shown to be used with wire placement (e.g., lower thread 258) for electrical conduction applications, the same technique can be used to place a conduit (not shown) for heat conduction applications.

Figures 3A, 3B, 3C, 3D:
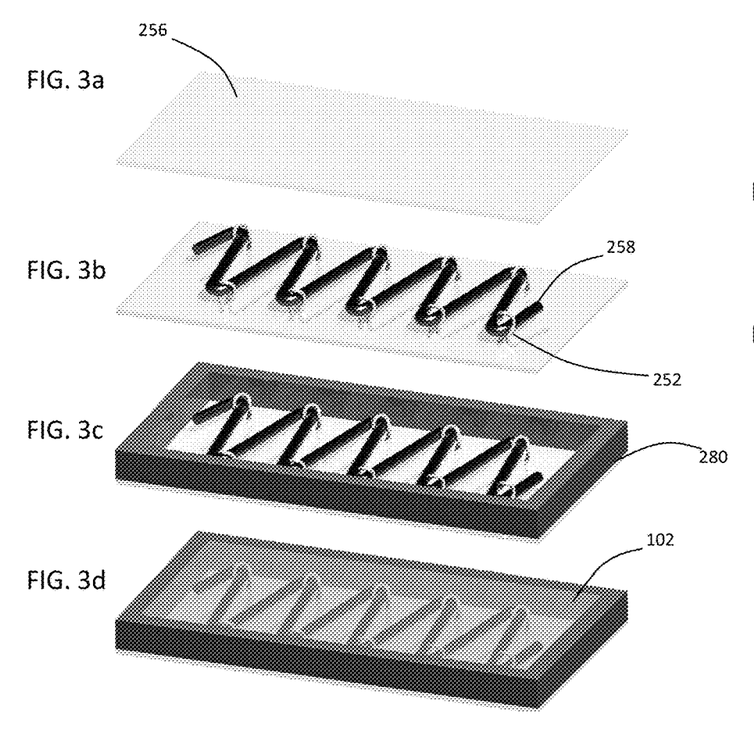
FIGS. 3a-3f depict a process of fabricating the highly stretchable electrical conduction and/or heat transfer arrangement, according to one embodiment of the present disclosure.
Figures 3E, 3F:
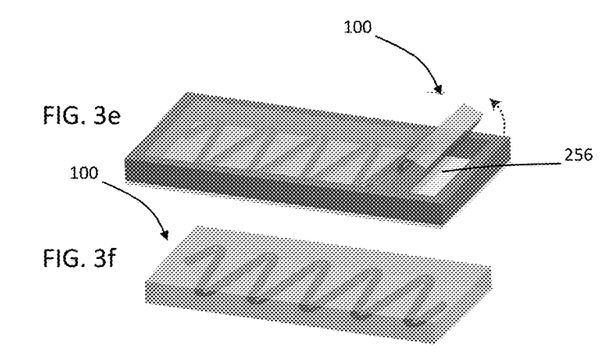

The process of fabricating the highly stretchable electrical conduction and/or heat transfer arrangement 100 is shown in FIGS. 3a-3f. According to one embodiment, a dissolvable polyvinyl alcohol (PVA) thread (80 μm-diameter, e.g., SUPERIOR THREADS, Saint George, Utah) is used as the upper thread 252, and a thin (90 μm) magnet wire (e.g., TEMCO INDUSTRIAL POWER SUPPLY, Fremont, Calif.) is loaded into the bobbin 260 to be used as the lower thread 258. The tension of the PVA is adjusted such that the conductive wire remains on only one side of the substrate 256 (e.g., PET) throughout the sewing process (i.e., the upper thread 252 does not penetrate the substrate 256 through its thickness. Next, an appropriate stitch pattern is selected (e.g., zigzag). The stitch width and stitch length are then set. The wire/PVA pattern can then be sewn onto a 100 μm-thick PET sheet (3M PP2500) substrate 256 as shown in FIGS. 3a and 3b. Subsequently, the wire side of the PET sheet is covered with an elastomer pre-polymer (e.g., ECOFLEX, SMOOTH-ON, Inc.) used as a precursor to the medium 102 by employing an acrylic frame 280 as a spacer to control the thickness of the medium 102, as shown in FIGS. 3c and 3d. The ECOFLEX is allowed to crosslink (e.g., at room temperature for 5 hours). This step transfers the sewn metallic pattern (i.e., the wire/PVA pattern) onto the elastic medium 102 (crosslinked ECOFLEX) with elastic modulus of about 10.4 kP. Finally, the stretchable embedded wires in the medium 102 are released from the PET (i.e., upper thread 252) by soaking the structure in water at 40° C. for 15 min. By submerging the structure in warm water the PVA thread dissolves, allowing the stretchable connections to be easily peeled off the substrate 256, as shown in FIG. 3e. Once the substrate 256 is completely peeled off, the releasing the highly stretchable electrical conduction and/or heat transfer arrangement 100 is provided, as shown in FIG. 3f.

Figure 4:
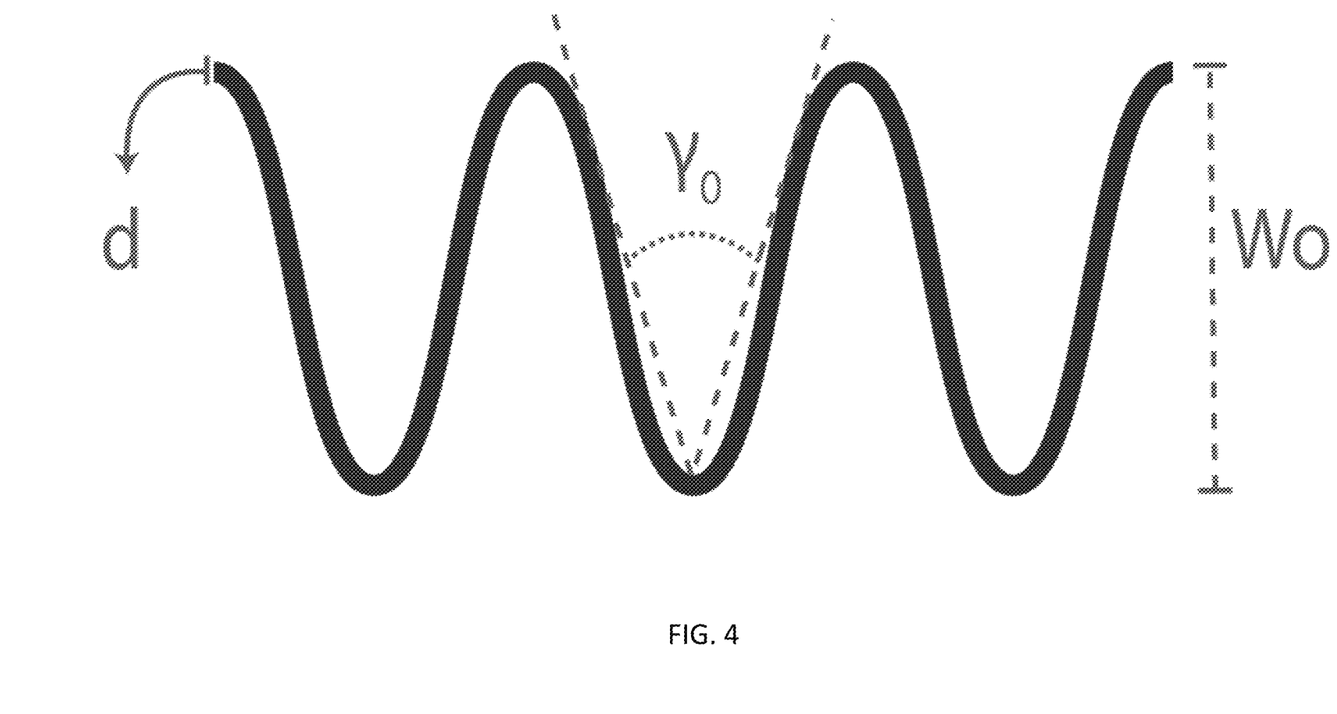
FIG. 4 is a diagram showing various design parameters of one exemplary pattern.

In order to determine various parameters associated with the design of stitching, reference is now being made to FIG. 4. Trace thickness (d) and the unstrained width ($W_o$) correspond to the wire diameter and the stitch width, respectively. The pitch angle ($\gamma_o$) is a function of the stitch width and the stitch length (i.e., stitch length≈$2W_o \tan \gamma_o/2$). For a zigzag pattern, the pitch angle is the primary determinant of stretchability and is inversely proportional to the maximum elongation of the structure. The angle can be made arbitrarily small if wire thickness is ignored. In practice, however, some sewing machines may impose a lower limit of $\gamma_o=18°$, with smaller values resulting in overlapping zigzag tracks that prevented stretchability. Using this method, various zigzag patterns embedded in the medium 102 such as those discussed above can be generated. The structures generated according to the teachings of the present disclosure were found to be highly elastic, soft, and partially adhesive, all qualities that enable uniform contact between the wires and any adjacent surface even at high curvatures (e.g., greater than 0.52 mm$^{-1}$).

In addition to being highly stretchable, the wire patterns can be readily integrated with other electronic components. For example, the fabrication process is adaptable to many thin wires of different materials or thicknesses. The ability to use coated wires offers the option of overlapping/crossing over traces to create more compact circuits without shorting out the connections.

Figure 5A:
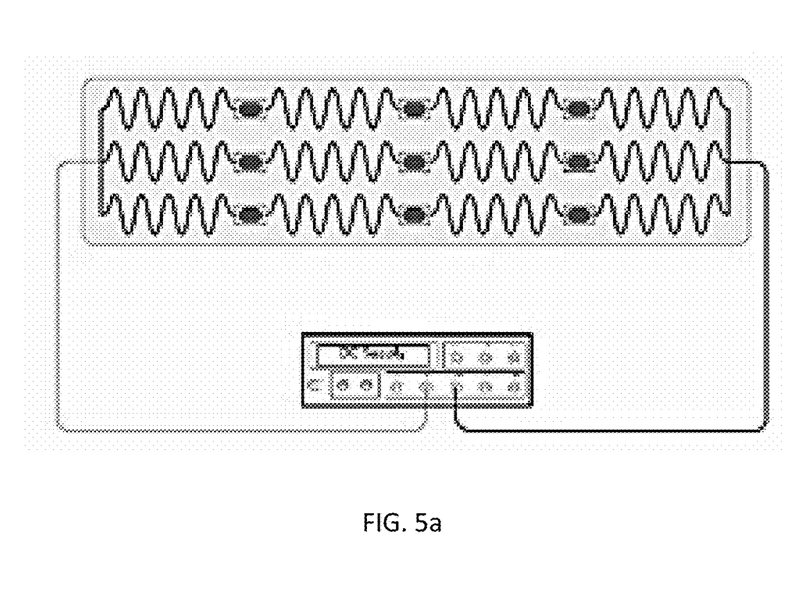
FIGS. 5a and 5b depict light emitting diodes (LEDs) placed in circuit according to the present disclosure both in the form of a schematic (FIG. 5a) and a photograph of the LEDs stretched over a ball (FIG. 5b).
Figure 5B:
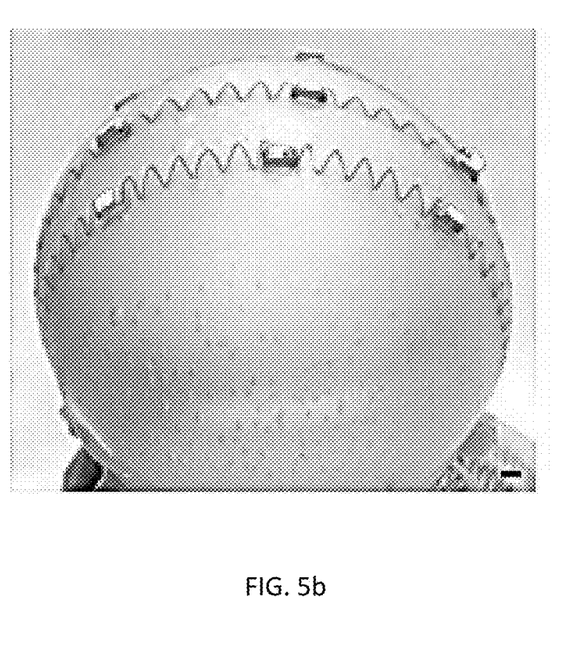

Additionally, surface-mount electronic devices (e.g., light emitting diodes (LEDs) or other integrated circuits (ICs)) can be placed onto the stretchable medium 102. To mount LEDs (or ICs, generally), wire from the upper thread 252 is first patterned on the substrate 256 and is subsequently cut (either mechanically or with laser) at locations where LEDs or ICs are to be located. The LEDs/ICs are then soldered onto the wire at these locations using a standard soldering technique (the heat from the soldering iron is sufficient to burn off any wire insulation and allow proper soldering). With this design, the mounted LEDs are connected in series along the length of the wire. For commercial manufacturing applications, other fine-pitch components may be soldered using standard commercial soldering techniques, as long as the device pad-pitch is not larger than the wire diameter (e.g., 100 μm of the present disclosure). The other steps of the fabrication can proceed as provided above. A schematic model of the stretchable array of interconnect wires with the 9 LEDs is shown in FIG. 5a with its actual implementation shown in FIG. 5b, where the stretchable arrangement with LEDs is stretched over a ball.

The stretchable interconnects were quantitatively evaluated in terms of their resistance stability in response to strain and their robustness under repeated stretch/release cycles. Stretchable conductive patterns of the prior art that are fabricated via thin metal layer deposition on elastomeric substrates provide a significant increase in their electrical resistance when the structures are subjected to strain. In contrast, the structures of the present disclosure use stretchable patterns (e.g., zigzag) and use solid micro-wires, which exhibit very low resistance change even at strain levels as high as 500%. The resistance of interconnections with different un-strained pitch angles $\gamma_o$ was measured under variable tensile strain. Each interconnect sample was clamped by its two ends and connected to a multi-meter to continuously record the resistance change in the tracks. The tensile strain was continuously increased until the wires were completely straightened ($\gamma=180°$).

Figure 6A:
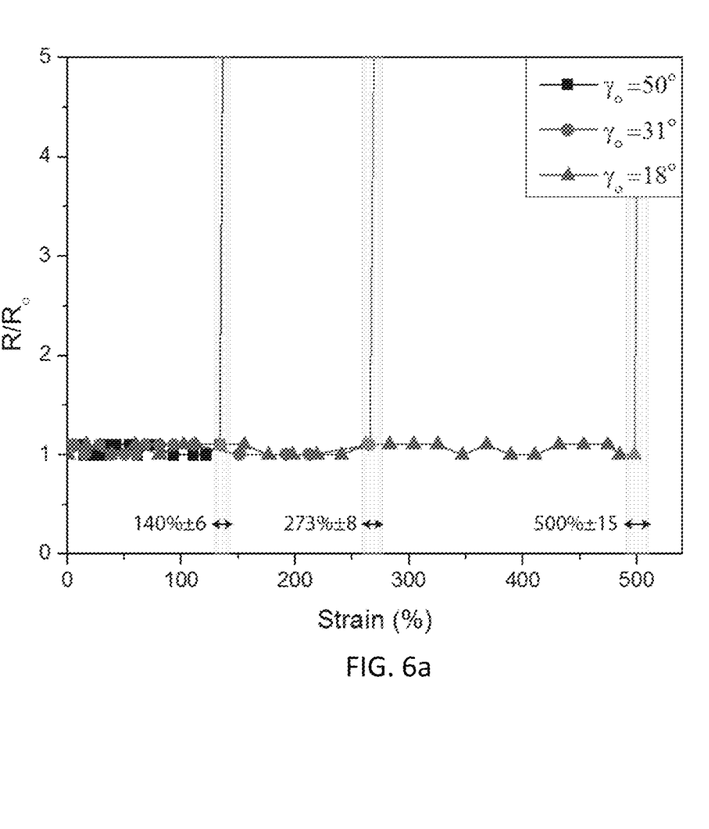
FIG. 6a is a plot of normalized resistance of the wire used in the arrangement of the present disclosure in the stretched vs. non stretched positions for various design parameters.

Referring to FIG. 6a, a normalized resistance change (R/R$_o$) vs. strain for patterns with different un-strained pitch angles of 18°, 31°, and 50° (R$_o$ is the initial resistance, <1Ω, and R is the strained resistance) are provided. As can be seen, the impedance values are stable up to the breaking point of the wire, with 18° pitch angles being able to withstand 500% strain. The breaking point of the wire is shown in the figure as a steep increase in resistance (off the chart, as it exceeded the measurement limits of the multi-meter). The shaded region surrounding the vertical lines represents one standard deviation error about the mean failure point (n=5 samples). The tests show that for strains smaller than 270% the ECOFLEX did not exhibit detectable damage or any sign of delimitation. For larger strains (500%), however, the ECOFLEX showed some plastic deformation. No delamination of ECOFLEX from the wire was observed in either case. Furthermore, no hysteresis was observed as long as the stretchable interconnects were not subjected to strains beyond elastic limit.

Figure 6B:
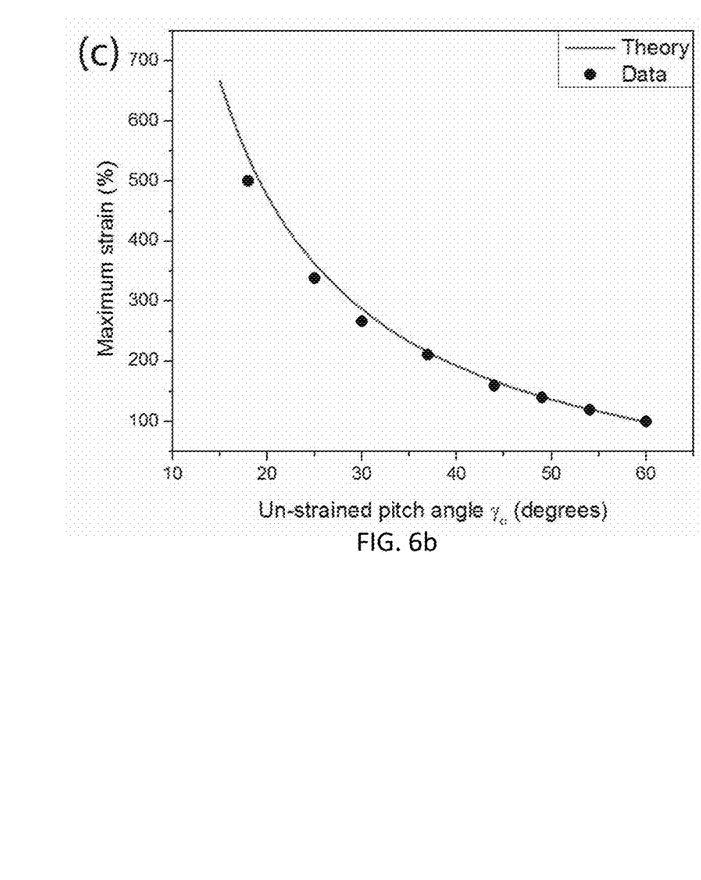
FIG. 6b is a plot of maximum strain for the arrangement of the present disclosure having different values of un-strained design parameters ($\gamma_o$ and $W_0$).

Additionally, the maximum strain for stretchable interconnects having different values of un-strained design parameters ($\gamma_o$ and W$_o$) were investigated and here reported in reference to FIG. 6b. As expected, the maximum attainable mechanical tensile strain of various samples shows an inverse relationship with the un-strained pitch angle $\gamma_o$ (no dependence with W$_0$ was observed). This trend agrees with the equation for maximum strain ($\varepsilon_{max}$), which can be derived from the geometry of the zigzag pattern (Eq. 1):

$$\varepsilon_{max} = \frac{1 - \sin\left(\frac{\gamma_o}{2}\right)}{\sin\left(\frac{\gamma_o}{2}\right)} \quad (1)$$

This expression highlights that the maximum strain is only a function of $\gamma_o$ and is not affected by the track width (W$_o$).

Figure 6C:
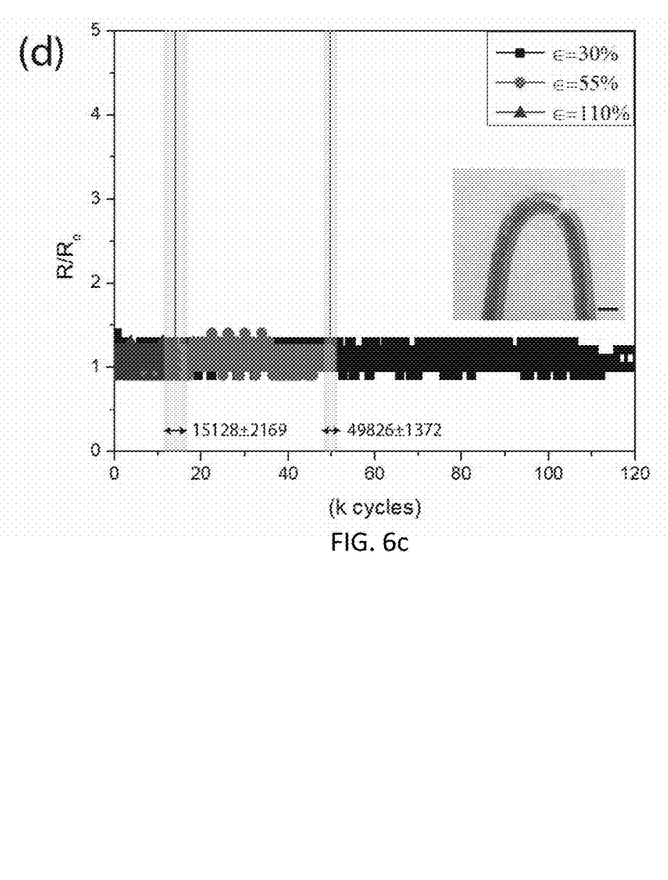
FIG. 6c is a plot of normalized resistance of the arrangement of the present disclosure when cycled.

In order to evaluate the reliability of interconnects; the patterns were subjected to repeated stretch and release cycles at various strain levels (30-110%). Each test sample was clamped at one end and attached to a magnetically controlled diaphragm at the other end. The diaphragm displacement stretched the sample at a rate of 60% per second for 120,000 cycles. The electrical resistance of the sample was measured continuously during the stretching and releasing cycles. The test was repeated for five samples with a pitch angle of 18° at each level of strain (30%, 55%, and 110%). FIG. 6c shows the results. For 30% strain, satisfactory device performance was maintained for more than 120,000 cycles. For larger strains (110%), however, the devices showed degraded performance and failure at a lower number of cycles (15,128±2,169). Interconnect failure was primarily due to wire breakage at the corners of the zigzag pattern caused by metal fatigue, as shown in the inset of FIG. 6c.

Figure 7A:
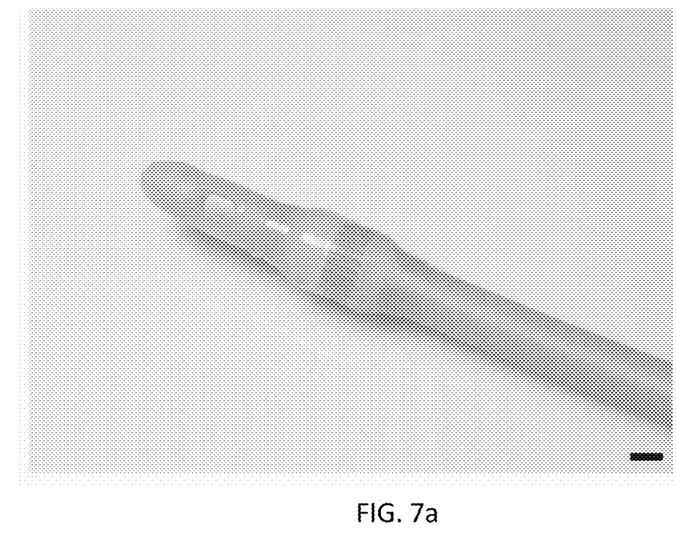
FIGS. 7a and 7b are photographs of a catheter with the arrangement of the present disclosure attached thereon (in uninflated state (FIG. 7a) and inflated state (FIG. 7b)).
Figure 7B:
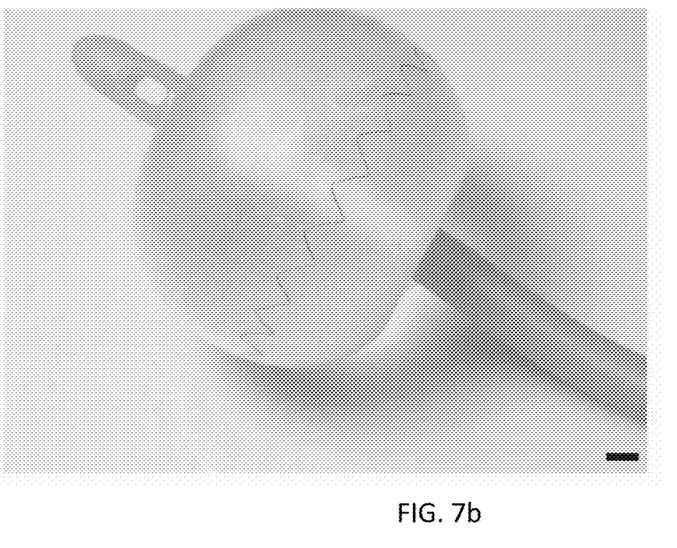
Figure 8A:
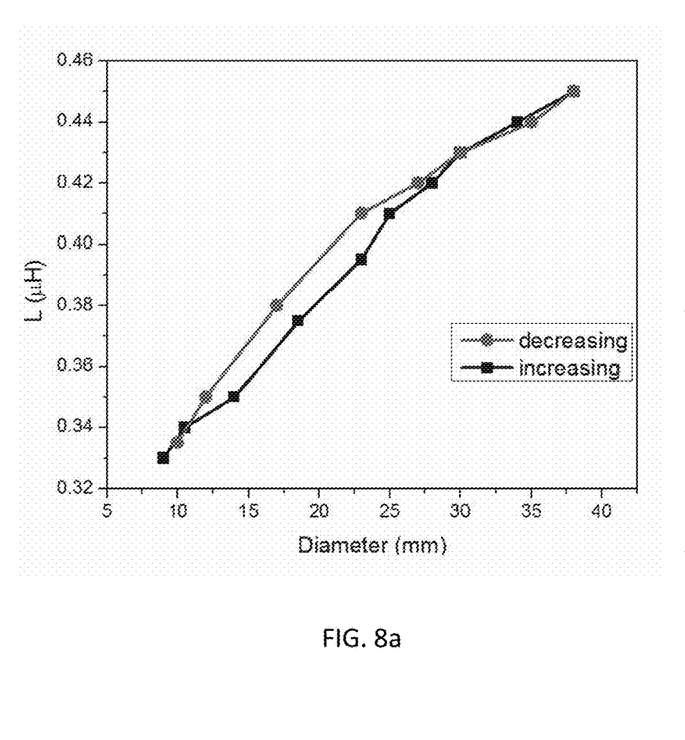
FIGS. 8a and 8b are plots of inductance vs. diameter and time respective when an arrangement of the present disclosure is used as an inductive strain sensor during inflation and deflation cycles.
Figure 8B:
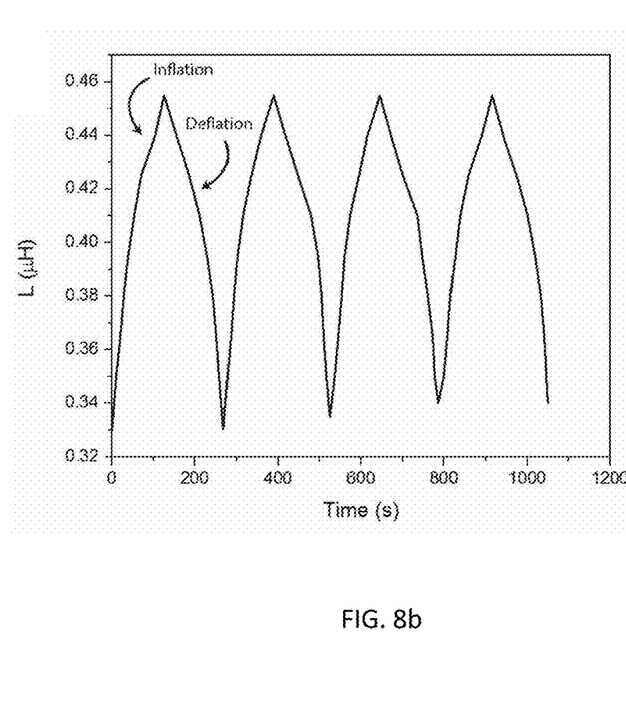

One practical application is an inductive strain sensor that was subsequently mounted onto the balloon of a BARDEX Foley urinary catheter for monitoring the inflation of the catheter balloon inside bladder. The device includes a stretchable single loop coil created on ECOFLEX via the sew-and-transfer method and bonded around the balloon region of a 20F Foley catheter using uncrosslinked ECOFLEX. The coil was made of a single loop of wire (100 μm thick) patterned into a curved zigzag with 400 μm spacing between each zigzag. FIG. 7a shows a photograph of the catheter with the sensor attached. By inflating the balloon, the zigzag angle and coil diameter increase significantly, as shown in FIG. 7b. Since the inductance of the single loop coil (with radius R and wire thickness d) can be approximated by $$L \approx \mu_0 R \left[\ln\frac{8R}{d} - 1.75\right],$$

inflating the balloon is expected to increase the coil inductance. The inductance was continuously monitored at 200 kHz with an LCR meter (GW INSTEK LCR-819). The sensor was tested by gradually inflating the balloon with water and subsequently deflating it. The measured inductance vs. balloon diameter (between 9 mm and 38 mm) is plotted in FIG. 8a, showing a positive trend between the inductance and the diameter with an average sensitivity of 4 nH/mm and very little hysteresis (a maximum of 3.1%). In order to assess repeatability and drift, the sensor was subjected to four cycles of catheter balloon inflation and deflation. A syringe pump was connected to the inlet of the catheter to control fluid flow. For each cycle, 35 mL of water were injected and withdrawn from the balloon at a flow rate of 15 mL/min. The results in FIG. 8b show that the sensor has satisfactory repeatability, with miniscule drift (0.01 µH) from the initial deflated state. The small drift is attributed to plastic deformation of the catheter.

It should be appreciated that while a transfer technique has been discussed above, attachment of the conductor or tube assembly to a stretchable fabric can be accomplished by simply sewing the conductor/tube to the fabric in a pattern (e.g., zig-zag) such that the conductor/tube can change length when the fabric is elongated.

Figure 9:
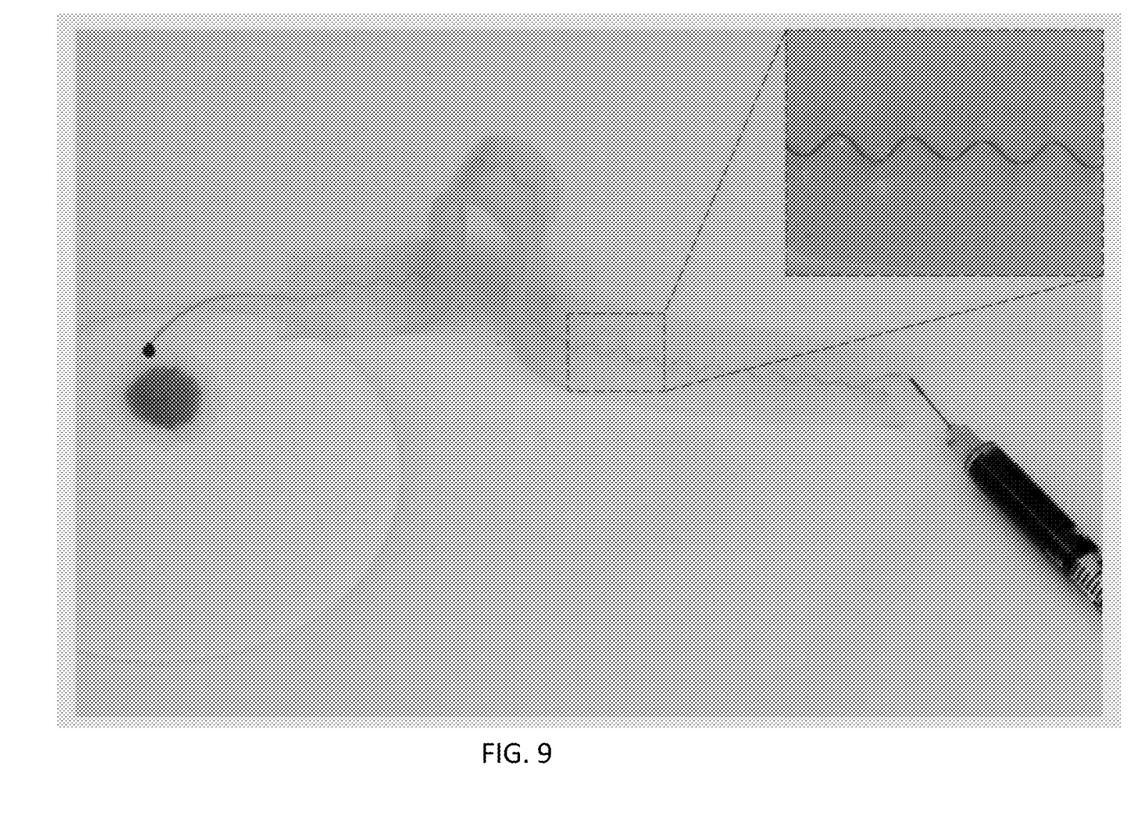
FIG. 9 is a photograph of a tube assembly arrangement showing fluid being injected in one end and exiting from another end of the tube assembly.

Referring to FIG. 9 a photograph of a tubular arrangement in a zig-zag pattern embedded in a substrate is provided. Fluid is shown to be injected in one end of the tubular arrangement and exited from the other side. Fluid can be externally cooled or heated by active mechanisms, e.g., by a battery or electrically powered heater or a refrigerator having a refrigerant passing through a heat exchanger, or by a passive mechanism, e.g., thermal reactions that can heat or cool the fluid.

Applications of the arrangements disclosed herein can include fast heating/cooling of a human subject by placing the tubular arrangement in a head, neck, or other clothing articles when such heating or cooling is needed.

Those skilled in the art will recognize that numerous modifications can be made to the specific implementations described above. The implementations should not be limited to the particular limitations described. Other implementations may be possible.

The invention claimed is:

1. A method to generate a stretchable conductor, comprising:
    placing a conductor wire on one side of a substrate according to a predetermined pattern by securing a dissolvable filament for temporary maintenance of placement of the conductor wire on the substrate;
    placing the filament-secured substrate in a mold;
    pouring a moldable medium on to the mold on top of the filament-secured substrate;
    crosslinking the moldable medium thereby allowing the conductor wire to adhere to the moldable medium;
    dissolving the dissolvable filament; and
    removing the substrate from the moldable medium.

2. The method of claim 1, the predetermined pattern is a zigzag pattern.

3. The method of claim 1, the dissolvable filament pierces through the substrate.

4. The method of claim 1, the substrate is poly (ethylene terephthalate).

5. The method of claim 1, the dissolvable filament is polyvinyl alcohol.

6. The method of claim 1, the moldable medium is an elastomer.

7. The method of claim 1, the moldable medium is rubber.

* * * * *